No. 715,534. Patented Dec. 9, 1902.
S. H. ATCHISON.
APPARATUS FOR DISPENSING LIQUORS AT HIGH PRESSURE AND AT VARIOUS DEGREES OF TEMPERATURE.
(Application filed Nov. 21, 1898.)
(No Model.) 2 Sheets—Sheet 1.
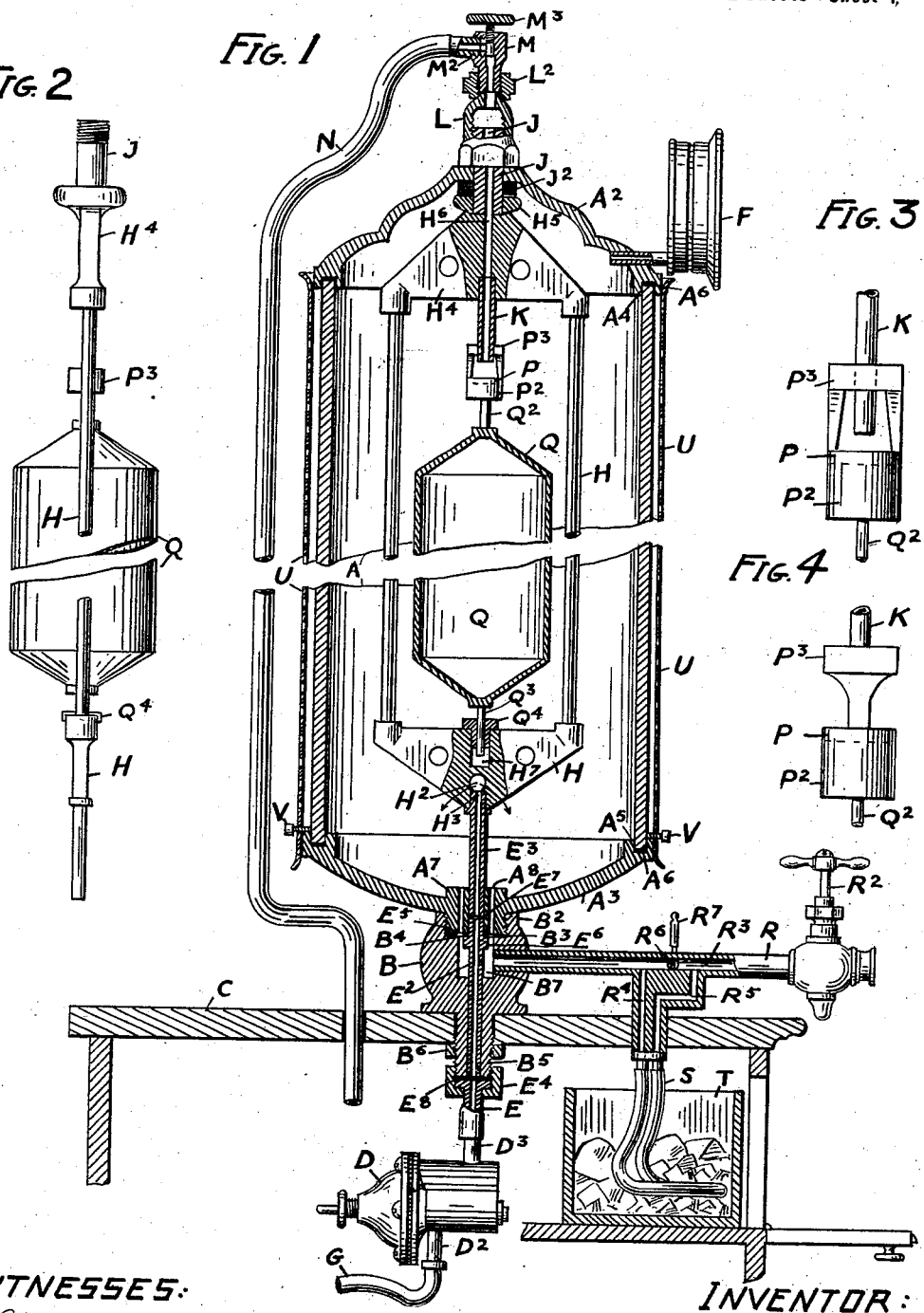
WITNESSES:
Léon Boillot
John H. Green
INVENTOR:
Samuel H. Atchison
by A. H. Ste Marie
atty No. 715,534. Patented Dec. 9, 1902.
S. H. ATCHISON.
APPARATUS FOR DISPENSING LIQUORS AT HIGH PRESSURE AND AT VARIOUS DEGREES OF TEMPERATURE.
(Application filed Nov. 21, 1898.)
(No Model.) 2 Sheets—Sheet 2.
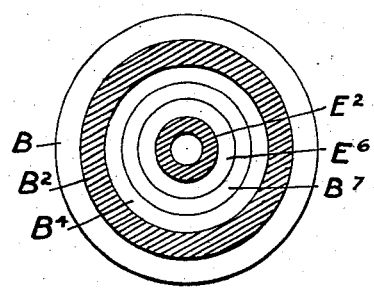
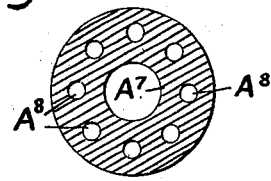
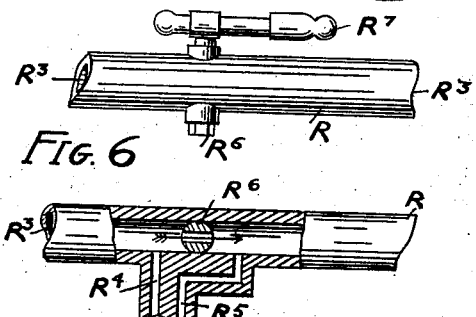
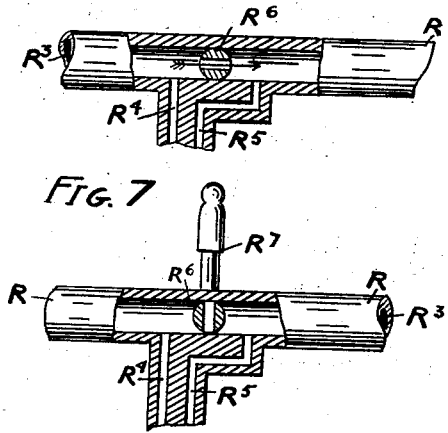
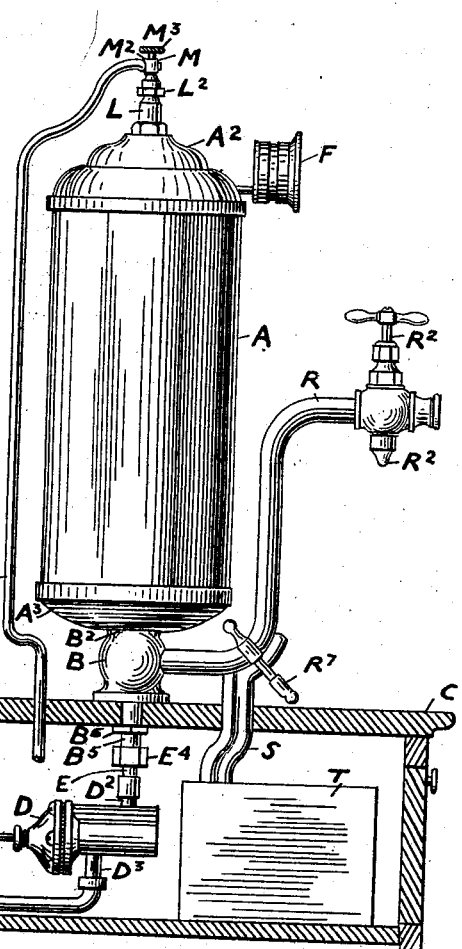
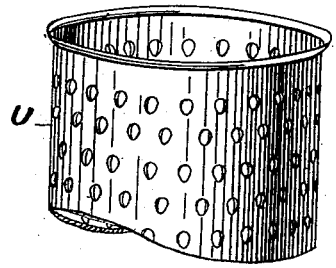
WITNESSES:
Léon Boillot
John H. Green
INVENTOR:
Samuel H. Atchison
by A. H. Ste. Marie
atty

UNITED STATES PATENT OFFICE.

SAMUEL H. ATCHISON, OF SAN FRANCISCO, CALIFORNIA, ASSIGNOR TO HENRY ARNKE, OF SAN FRANCISCO, CALIFORNIA.

APPARATUS FOR DISPENSING LIQUORS AT HIGH PRESSURE AND AT VARIOUS DEGREES OF TEMPERATURE.

SPECIFICATION forming part of Letters Patent No. 715,534, dated December 9, 1902.

Application filed November 21, 1898. Serial No. 697,095. (No model.)

*To all whom it may concern:*

Be it known that I, SAMUEL H. ATCHISON, a citizen of the United States of America, and a resident of the city and county of San Francisco, in the State of California, have invented a new and useful Apparatus for Dispensing Malt Liquors at High Pressure and at Various Degrees of Temperature, of which the following is a specification.

My invention has for its object to provide an apparatus through which high-pressure beer can be drawn in a drinkable condition without venting the barrels containing it and from which it can be had either at its natural temperature or ice-cold or moderately cold, &c., as may be called for by the consumers.

By the words "high-pressure" beer is meant here and throughout the following specification every species of malt liquor, such as ordinary beer, porter, steam-beer, and similar liquids containing or charged with a quantity of gas sufficient to keep them in a state of effervescence or cause them to foam when drawn.

The drawings hereto annexed illustrate what is considered one of the best and most practical forms of my invention.

In the said drawings, Figure 1 is a sectional elevation of the complete apparatus, the same comprising a self-venting beer-font, an automatic regulator, a cooler, a drawing-off faucet intermediate of the font and cooler, and several other more or less important parts described hereinafter. Fig. 2 is a detailed view in elevation of a float used in the beer-font, the said float and the parts connected therewith being shown in a position at right angles to that in which they appear in Fig. 1. Fig. 3 is an enlarged view of a valve cup or casing carried by the upper end of the said float. Fig. 4 is a view of the same valve casing or cup, taken at right angles to Fig. 3. Fig. 5 is a top view of part of the shank of the faucet by means of which the beer is drawn from the apparatus, the same having a lever-operated valve that controls the flow of liquid through the faucet-shank. Fig. 6 is a side view of the part of the faucet-shank represented by Fig. 5, showing the lever-operated valve in section and open. Fig. 7 is a view similar to Fig. 6, showing the lever-operated valve closed. Fig. 8 is a horizontal section of the base of the beer-font, taken from line *x x* of Fig. 1. Fig. 9 is a horizontal section of the bottom part of the beer-font, where both the inlet and the outlet for the beer are located. Fig. 10 is an elevation of an apparatus of same construction as is shown at Fig. 1, except that it is provided with a swan's-neck faucet instead of a straight one and the shield of the beer-font is omitted. Fig. 11 is a broken perspective view of the shield that is used in connection with the beer-font in the form of the apparatus represented by Fig. 1.

Like letters refer to the same or corresponding parts in all the figures.

As stated above, the apparatus includes, among other parts, a font adapted to hold a certain quantity of beer, which it may receive from one or more barrels or from any other source. This font consists of a cylinder A, made of glass, preferably, and having a metallic top $A^2$ and metallic bottom $A^3$. The upper end of the said cylinder fits in an annular groove $A^4$ in the top piece $A^2$, and its lower end fits in a similar groove $A^5$ in the bottom piece $A^3$, both said grooves having washers $A^6$, which render the font fluid and gas tight. The beer-font thus made is mounted on a metal base B, which may rest upon a counter, table, stand, or other support C. The bottom $A^3$ of the font screws onto the base B, the said bottom having a screw-threaded central projection $A^7$, that is engaged in a corresponding collar $B^2$ on the upper part of the base B and bears at the edge on a washer $B^3$, laid on a circular seat $B^4$ therein. The base B has a downward tubular extension $B^5$ passing through the counter C and screw-threaded at its lower end to receive a nut $B^6$, which firmly secures the base to the counter through the said extension, and therefore keeps the font steady and in an upright position.

The beer, which may be under any desired pressure in the barrel, keg, or reservoir in which it is contained—say a pressure of one hundred pounds and over—is admitted into the font through an automatic regulator D, connected to it by means of pipes E $E^2$ $E^3$, that form a continuous passage or channel between said regulator and the bottom part of said font. This regulator may be of any known kind, type, or form that will allow or check the flow of beer through it, according to any pressure that it may be desired to have in the font when properly adjusted. The pressure in the font is indicated by the gage F. This gage is the guide to be followed in the adjustment of the regulator to make the latter work according to the pressure desired in the font. The regulator is connected with the source from which the high-pressure beer is supplied by a pipe G, coupled to the inlet $D^2$, and it is connected with the font through the pipes E $E^2$ $E^3$ aforesaid, to the first of which the outlet $D^3$ is coupled. The pipe E is connected by a union-coupling $E^4$ with the pipe $E^2$ and the tubular extension $B^5$ of the base B under the counter C. The pipe $E^2$ is sweat in the tube $B^5$ and the base B and runs up into the cylindrical projection $A^7$ of the bottom piece $A^3$ of the font, part of the under side of said projection bearing on a washer $E^5$, placed upon a flange $E^6$, formed on the outside of said pipe $E^2$. The upper end of the latter-named pipe is detachably connected with the projection $A^7$, so that the font can be easily removed when unscrewing said projection from the collar $B^2$. The pipe $E^3$ runs from the upper end of the pipe $E^2$ in the projection $A^7$ of the font's bottom, where it is sweat or brazed in, up to the under side of a crotch H, in which it is also sweat or brazed. Washers $E^7$ $E^8$ are placed between the different lengths of pipe E $E^2$ $E^3$. The beer, as is indicated by the arrows in Fig. 1, flows out of the pipe $E^3$ into the font through a transverse opening $H^2$ made in the lower part of the crotch H directly above the hole $H^3$, in which the discharge end of said last-named pipe is fitted, the beer being thrown out on both sides of the crotch through said opening $H^2$.

The crotch H aforesaid has an upper bridge-piece $H^4$, that connects its two branches one with the other and is provided at the top with a socket $H^5$, in which is sweat or brazed the lower end of a short pipe J, that passes through the center of the top $A^2$ of the font. A vertical passage $H^6$, formed in the bridge $H^4$, connects at its upper end with this pipe J, and in the lower end of said passage is fitted another small pipe K, that projects downward midway between the branches of the crotch. A washer $J^2$ is placed around the pipe J between the under side of the top of the font and the socket-piece on the bridge $H^4$, in which said pipe is secured. The two pipes J and K, taken together with the passage $H^6$ in the crotch, form the outlet through which the font is vented.

L is a bell-shaped nut that engages an external thread on the outer end of the pipe J and bears on the upper central part of the top of the font. It is through this nut that the several parts composing the font are bound to one another and tightened, including the crotch and pipes thereto connected. When the said nut is unscrewed, the font can be taken apart and all the pieces in it removed one by one. When it is screwed down in place, the font and parts therein become a compact and solid structure, and the same can be taken off the counter as a whole by merely unscrewing it from the collar of the base B. This construction is convenient in that it allows the font to be overhauled and cleaned on the counter itself or away from it, as may be found most expedient.

To the upper end of the bell-shaped nut L is secured by a coupling $L^2$ a nipple M, having a hole $M^2$ in its side and a screw-valve $M^3$ in its top, that controls this side hole. The nut and nipple form a continuation of the font's vent, which is thus brought under the control of the valve $M^3$. By screwing down this valve, as shown in Fig. 1, the vent is stopped and the beer-gas is forced to remain in the font. On the contrary, when the valve is unscrewed the vent becomes open and the gas or part of it is released through the side hole $M^2$. The vent is to remain open when the apparatus is working under normal conditions and the supply of beer to the font is abundant. It is closed when the keg or other receptacle from which the beer is supplied is emptied, and the beer runs low in the font or otherwise when the apparatus accidentally gets out of order. Stopping the vent when the supply of beer is getting short allows the font to empty itself entirely, even when the faucet used draws at a higher level than the bottom of the font—for example, the faucet shown in Fig. 10—because the pressure of the gas that comes from the keg and is preserved in the font is sufficient to force the beer out to the last drop. The font then empties at the pressure of the keg.

Connected with the vent of the font is a pipe N, which is secured at its upper end in the side hole $M^2$ of the nipple M and thence runs down by the side of the font to a point below the counter C, through which its lower end is passed. This pipe is employed for conducting the beer-gas below the counter and also for carrying off the beer or foam thereof which now and then will spurt out of the nipple. Cleanliness of the apparatus is thus insured. The gas that comes out of the pipe N may either be allowed to go to waste or else be collected and utilized in various ways through a special apparatus. One form of such special apparatus is described and illustrated in my pending application No. 633,159.

The venting of the font when the screw-valve M is opened to permit it is more or less rapid and ceases at intervals, according to the rise and fall of the beer in the font, being regulated by a rubber valve P, operated by a float Q. This valve P is held in a small cup or casing $P^2$ and is arranged to bear on and close the lower end of the pipe K when the float Q rises with the beer. The cup P² carries at its upper part a guide P³, through which the pipe K passes and by which the valve P is kept in line with said pipe while being moved to and away from it. The float Q is preferably made of porcelain or rubber and is placed centrally between the standards or lateral branches of the crotch H. It is provided with two stems or pins Q² Q³, one at either end. The upper stem Q² is secured to the under side of the valve-cup P², and the lower stem Q³ is slipped in a bushing Q⁴, which fits in a hole H⁷ in the upper edge of the lower part of the crotch H. The stem Q³ and bushing Q⁴ are inserted in and come out of the hole H⁷ together. Thus arranged the float is easily set in place and removed and with the casing P² and valve therein is always properly guided within the crotch when working up and down with the rise and fall of the beer. The font, it will be understood, will fill with beer according to the regulation of the float and the pressure of the beer-gas.

A series of holes A⁸, bored through the central projection A⁷ of the font's bottom A³, Figs. 1 and 9, make up the outlet for the beer contained in the font. These holes are arranged in a circle around the central opening in which the adjoining ends of the inlet-pipes E² E³ are inserted. The beer flowing through the holes A⁸ runs first into a cavity B⁷ in the base B and thence is drawn out by means of the faucet R, the shank of which screws into the side of said base. This faucet is of that type of valves or cocks which are known under the name of "high-pressure" faucets and has a solid screw-plug R² running through its outer end, which upon being screwed down allows the beer to flow out in a thin stream all around it. The plug R² could also be arranged to screw up to let out the beer, if preferred. In other words, the plug can be arranged to be either raised or lowered from its seat to let out the beer.

S is a coiled pipe that is placed in an ice-box T under the counter C and connects with the under side of the shank of the faucet R in either of the ways illustrated in Figs. 1 and 10, according to the shape of the faucet employed. The said coiled pipe and ice-box constitute a cooler for the beer that is drawn from the font. As shown in Fig. 1, the pipe S is first bent in two, then coiled around from the middle to form a worm that rests on the bottom of the box T, and finally its two ends are turned up together and soldered or otherwise coupled with the under side of the faucet in such a way that they will respectively communicate with secondary channels R⁴ R⁵, extending down from the main channel R³, that runs through the faucet-shank. A rotary valve or cock R⁶, worked by means of a small lever R⁷, is placed in the channel R³ between the channels R⁴ R⁵. The ice is usually placed on the coiled portion of the pipe S and may be packed all around it in the box T, if desired.

It will now be seen that the beer can be drawn through the faucet in different ways. If the valve R⁶ be opened, by placing the lever R⁷ in the position indicated in Figs. 5 and 6 the beer will upon screwing down the plug R² flow in a straight course through the main channel R³ of the faucet and come out at the same temperature as it is in the font. As the secondary channels are permanently open, some beer will of course run through the coiled pipe S; but this will not affect in any appreciable degree what passes directly through the main channel, because the beer thus passing through the main channel remains at the temperature of the font and prevents circulation of the colder beer that runs in the cooler; but if the valve R⁶ be closed by turning up or down the lever R⁷, as in Figs. 1, 7, and 10, the whole flow of beer will thereby be diverted from the main channel into the secondary channel R⁴ and forced to circulate through the coil S before it is directed back again into the main channel through the secondary channel R⁵, and the beer will come out of the faucet ice-cold. By setting the lever R⁷ at the proper angle the beer could be made to flow through both the valve R⁶ and the coil S, and moderately cold beer would be had. The beer can likewise be obtained at almost any degree of temperature desired by changing the angle of the lever, the temperature varying according to which of the valve or cooler passes more beer. The same results would be arrived at by alternately opening and closing the valve R⁶ and drawing part of the beer directly from the font and part from the cooler. Whatever is done it will be noted that the beer is at no time shut off entirely between the font and the head of the faucet—that is to say, it can be changed from cold to warm, or the reverse, without stopping the flow through the outer end of the faucet, where the plug R² is located, and without handling this plug more than once. The flow is continuous through the head of the faucet when the plug is screwed down, no matter how the intermediate lever R⁶ is manipulated. Thus the temperature of the beer can be changed at will without stopping the flow.

As will be understood, the cooler above described may be located elsewhere than at the place indicated. In fact, it could be placed anywhere in the line of flow of the beer—for example, between the barrels and the regulator or between the regulator and the font. For practical reasons, however, I prefer placing it in the position herein shown and described. The other positions spoken of are mentioned merely to point out the scope of my invention, which contemplates all such changes.

The form of swan's-neck faucet shown in Fig. 10 operates precisely in the same way as that shown in Fig. 1 and excepting the shape is constructed exactly in the same manner. Faucets of the form represented in Fig.

10 are furnished for convenience where the beer is to be drawn above the counter, and especially when the fonts are set on cabinets.

U designates a metallic shield, which I provide when the body of the font is made of glass. This shield is slipped over the body of the font and not only protects the glass in a general way, but also prevents its being cut or scratched by evil-minded persons. It may be held in place in any desired manner, though ordinarily it is secured either to the bottom or to the top of the font by a screw or a flange or similar means. In Fig. 1 it is shown as being held by two set-screws V, that are passed through holes in its lower end and are driven in so as to bear on the outer edge of the bottom piece $A^3$; but one screw would be sufficient.

Having described my invention, what I claim, and desire to secure by Letters Patent of the United States, is—

1. In an apparatus of the character described, the combination with a supporting-base, of a supply-pipe leading into the same, a font supported by said base and detachable therefrom, an inlet-pipe within the font fixed thereto and detachable with the font from the base, said inlet-pipe forming a continuation of said supply-pipe when the font is in place on the base, a discharge-opening from said font into the base, and a service-pipe leading from said base and provided with a faucet, substantially as described.

2. In an apparatus of the nature described, the combination of a base, a supply-pipe leading into the same, a font supported by said base and detachable therefrom, an inlet-pipe fixed to said font within the same and forming a continuation of said supply-pipe when the font is in place on the base, a vent-valve, a supporting-bearing therefor supported by said inlet-pipe, a discharge-opening from said font into the base, a service-pipe leading from said base, and provided with a faucet, and a vent-pipe detachably coupled to the upper end of said font, substantially as described.

3. In an apparatus of the nature described, a font having an inlet-pipe extending thereinto through its bottom, and a vent-pipe extending up through its top, a crotch supported by said inlet-pipe and forming a connection between the inlet and vent pipes for supporting the latter from the former, and a float-operated valve within said crotch, substantially as described.

4. The combination of a beer-font, a supply-pipe, a crotch suitably supported by said supply-pipe in said font, a vent-pipe supported by and projecting inward from one end of said crotch, a float provided with two stems, one of which projects into one end of the crotch, a valve carried by the other stem in line with the inner end of said vent-pipe, and means for guiding the said valve on the vent-pipe, substantially as described.

5. An apparatus of the nature described comprising a font detachably mounted on a counter or other suitable support, the same receiving beer under pressure, a vent-pipe carried by the font, an automatic valve for controlling said vent-pipe, a fixed pipe outside of said font, a connection between said fixed pipe and said vent-pipe detachably connecting the same, and a hand-valve intermediate the fixed pipe and the vent-pipe, substantially as described.

Signed by me at San Francisco, California, this 15th day of November, 1898.

SAMUEL H. ATCHISON. [L. S.]

Witnesses:
A. H. STE. MARIE,
HENRY P. TRICOU.